US010830976B2

(12) United States Patent
Zhong et al.

(10) Patent No.: US 10,830,976 B2
(45) Date of Patent: Nov. 10, 2020

(54) SPLICING AND TERMINATION TRAY, DISTRIBUTION FRAME, AND FIBER DISTRIBUTION TERMINAL

(71) Applicant: HUAWEI TECHNOLOGIES CO., LTD., Guangdong (CN)

(72) Inventors: Laichong Zhong, Dongguan (CN); Yun Li, Dongguan (CN); Anliang Yang, Dongguan (CN); Wei Xiong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/395,445

(22) Filed: Apr. 26, 2019

(65) Prior Publication Data
US 2019/0250356 A1 Aug. 15, 2019

Related U.S. Application Data

(63) Continuation of application No. PCT/CN2016/103644, filed on Oct. 27, 2016.

(51) Int. Cl.
*G02B 6/00* (2006.01)
*G02B 6/44* (2006.01)
*G02B 6/255* (2006.01)

(52) U.S. Cl.
CPC ......... *G02B 6/4455* (2013.01); *G02B 6/4452* (2013.01); *G02B 6/4454* (2013.01); *G02B 6/255* (2013.01)

(58) Field of Classification Search
CPC .. G02B 6/4455; G02B 6/4454; G02B 6/4452; G02B 6/255
See application file for complete search history.

(56) References Cited

U.S. PATENT DOCUMENTS 7,570,861 B2 * 8/2009 Smrha .................. H04Q 1/06
  385/135
7,764,859 B2 * 7/2010 Krampotich ......... G02B 6/4455
  385/135
(Continued)

FOREIGN PATENT DOCUMENTS

CN  2519915 Y  11/2002
CN  2911708 Y  6/2007
(Continued)

OTHER PUBLICATIONS

Office Action issued in Chinese Application No. 201680089361.5 dated Sep. 27, 2019, 13 pages (with English translation).
(Continued)

*Primary Examiner* — Ellen E Kim
(74) *Attorney, Agent, or Firm* — Fish & Richardson P.C.

(57) ABSTRACT

The present disclosure relates to splicing and termination trays, distribution frames, and fiber distribution terminals. One example splicing and termination tray includes a lower splice tray and an adapter panel that is disposed at a front end of the lower splice tray. The adapter panel is detachable from the lower splice tray. Strength of the adapter panel is greater than strength of a molded part structure. An adapter mounting hole is provided on the adapter panel. The adapter mounting hole is used to fasten adapters. A quantity of the adapters is the nth multiple of 12, where n is a natural number greater than or equal to 2.

20 Claims, 4 Drawing Sheets

(56) References Cited

U.S. PATENT DOCUMENTS

| | | | | |
|---|---|---|---|---|
| 7,873,253 B2* | 1/2011 | Smrha | ............ | G02B 6/444 |
| | | | | 385/135 |
| 7,945,135 B2* | 5/2011 | Cooke | ............ | G02B 6/4455 |
| | | | | 385/135 |
| 8,059,932 B2* | 11/2011 | Hill | ............ | G02B 6/46 |
| | | | | 385/135 |
| 8,086,084 B2* | 12/2011 | Bran de Leon | ...... | G02B 6/4454 |
| | | | | 385/134 |
| 8,452,148 B2* | 5/2013 | Cooke | ............ | G02B 6/4455 |
| | | | | 385/135 |
| 8,660,397 B2* | 2/2014 | Giraud | ............ | G02B 6/4441 |
| | | | | 385/135 |
| 9,020,320 B2* | 4/2015 | Cooke | ............ | G02B 6/4452 |
| | | | | 385/135 |
| 9,383,538 B2* | 7/2016 | Giraud | ............ | G02B 6/4454 |
| 9,389,384 B2* | 7/2016 | Solheid | ............ | G02B 6/4452 |
| 10,001,617 B2* | 6/2018 | Clatanoff | ............ | G02B 6/444 |
| 10,094,996 B2* | 10/2018 | Cooke | ............ | G02B 6/4455 |
| 10,291,969 B2* | 5/2019 | Takeuchi | ............ | H04Q 1/02 |
| 2009/0324189 A1* | 12/2009 | Hill | ............ | G02B 6/4454 |
| | | | | 385/135 |
| 2011/0206334 A1* | 8/2011 | Liu | ............ | G02B 6/4454 |
| | | | | 385/135 |
| 2011/0268414 A1 | 11/2011 | Giraud et al. | | |
| 2014/0248028 A1* | 9/2014 | Campbell | ............ | G02B 6/4453 |
| | | | | 385/135 |
| 2014/0348480 A1* | 11/2014 | Giraud | ............ | G02B 6/4454 |
| | | | | 385/135 |
| 2014/0348481 A1 | 11/2014 | Giraud et al. | | |
| 2015/0355428 A1* | 12/2015 | Leeman | ............ | G02B 6/4454 |
| | | | | 385/135 |
| 2016/0216471 A1 | 7/2016 | Giraud et al. | | |
| 2016/0223770 A1* | 8/2016 | Geens | ............ | G02B 6/4455 |

FOREIGN PATENT DOCUMENTS

| | | |
|---|---|---|
| CN | 101295059 A | 10/2008 |
| CN | 201298089 Y | 8/2009 |
| CN | 201319080 Y | 9/2009 |
| CN | 201622373 U | 11/2010 |
| CN | 202794641 U | 3/2013 |
| CN | 202894641 U | 4/2013 |
| CN | 203535280 U | 4/2014 |
| CN | 203759298 U | 8/2014 |
| CN | 204065512 U | 12/2014 |
| CN | 105093416 A | 11/2015 |
| CN | 204993709 U | 1/2016 |
| CN | 105359020 A | 2/2016 |
| CN | 105378532 A | 3/2016 |
| WO | 2009045396 A2 | 4/2009 |
| WO | 2016123175 A1 | 8/2016 |

OTHER PUBLICATIONS

International Search Report and Written Opinion issued in International Application No. PCT/CN2016/103644 dated Jul. 28, 2017, 21 pages.
Extended European Search Report issued in European Application No. 16919818.1 dated Jul. 29, 2019, 8 pages.
Office Action issued in Chinese Application No. 201680089361.5 dated Aug. 11, 2020, 12 pages (with English translation).

* cited by examiner

SPLICING AND TERMINATION TRAY, DISTRIBUTION FRAME, AND FIBER DISTRIBUTION TERMINAL

CROSS-REFERENCE TO RELATED APPLICATION

This application is a continuation of International Patent Application No. PCT/CN2016/103644 filed on Oct. 27, 2016, the disclosure of which is hereby incorporated by reference in its entirety.

TECHNICAL FIELD

Embodiments of the present disclosure relate to fiber splicing and termination technologies, and in particular, to a splicing and termination tray, a distribution frame, and a fiber distribution terminal.

BACKGROUND

Currently, a splicing and termination tray is disposed in a fiber distribution terminal or a fiber distribution frame, and is mainly used for splicing of cables, mounting of an adapter, and the like.

A conventional splicing and termination tray includes two layers, that is, an upper splice tray and a lower splice tray. Specifically, referring to FIG. 1, FIG. 1 is a schematic structural diagram of a conventional splicing and termination tray. As shown in FIG. 1, in a structure of the conventional splicing and termination tray, an adapter and a lower splice tray are integrally mounted, so that the adapter is fastened by using the lower splice tray. The structure requires large space. Only 12 adapters can be mounted in an integrated structure. As a result, transmission and splicing of only 12-core fibers can be supported (that is, in the industry, a capacity of the splicing and termination tray is 12 cores).

With rapid development of communications, people require an increasingly high capacity of fiber splicing. By using the foregoing splicing and termination tray, only 12-core fibers can be spliced. Consequently, a splicing capacity is relatively low, and it is difficult to meet a communication requirement.

SUMMARY

Embodiments of the present disclosure provide a splicing and termination tray, a distribution frame, and a fiber distribution terminal. A detachable adapter panel is used to mount and fasten an adapter. This improves a capacity of a splicing and termination tray, and further improves a splicing capacity, thereby meeting a communication requirement.

According to a first aspect, an embodiment of the present disclosure provides a splicing and termination tray. The splicing and termination tray includes two layers. A lower layer includes a lower splice tray and an adapter panel that is disposed at a front end of the lower splice tray. The adapter panel is detachable from the lower splice tray. Strength of the adapter panel is greater than strength of a molded part structure. An adapter mounting hole is provided on the adapter panel. The adapter mounting hole is used to fasten adapters. A quantity of adapters is the $n^{th}$ multiple of 12, where n is a natural number greater than or equal to 2.

In the foregoing structure of the splicing and termination tray, the strength of the adapter panel is greater than the strength of the molded part structure, the adapter panel has a relatively small thickness and requires relatively small space. Therefore, the splicing and termination tray has relatively large space for mounting adapters, that is, more adapters can be mounted on the adapter panel that has a relatively small thickness. Therefore, in this embodiment of the present disclosure, the detachable adapter panel that has relatively great strength is used to mount and fasten an adapter. This can improve a capacity of the splicing and termination tray, and further improve a transmission capacity and a splicing capacity, thereby meeting a communication requirement.

In a feasible implementation, a handle is disposed on one side of the front end of the lower splice tray, and a slot and a buckle are disposed on the lower splice tray. A position of the adapter panel is restricted by means of fitting between the buckle and the slot, so that an adapter can be conveniently mounted and dismounted.

In a feasible implementation, a fiber ring is disposed on the other side of the front end of the lower splice tray. A first fastener is disposed on the fiber ring, and the first fastener is used to fasten the fiber ring on the adapter panel. The adapter panel is located between the handle and the fiber ring, to implement fiber routing management.

In a feasible implementation, a second fastener is disposed on the slot, and is used to fasten the adapter panel when the buckle is inserted into the slot, to fasten the adapter panel.

In a feasible implementation, the adapter panel is a sheet-metal adapter panel. Because the sheet-metal adapter panel has relatively great strength and requires relatively small space, more adapters can be accommodated.

In a feasible implementation, an adapter cover is disposed relative to a position of the adapter panel, the adapter cover is detachably hinged to the upper splice tray, and the adapter cover can be turned over along a hinge axis, so that the adapter panel can be conveniently mounted and dismounted.

In a feasible implementation, the splicing and termination tray further includes an upper splice tray, where the upper splice tray is connected to the lower splice tray by using a rotating-shaft fitting structure, and the upper splice tray is rotatably operable.

In a feasible implementation, the splicing and termination tray further includes a splice cassette, where the splice cassette is detachably disposed on the upper splice tray, and is used to splice fibers.

In a feasible implementation, the adapters are vertically mounted on the adapter panel. The adapters occupy a relatively small width when the adapters are vertical. Therefore, a capacity of the splicing and termination tray is improved.

In a feasible implementation, a thickness of the splicing and termination tray is less than 25 mm.

In a feasible implementation, a thickness of the splicing and termination tray is 19.5 mm.

In a feasible implementation, four groups of adapter mounting holes are provided on the adapter panel. Six adapters are fastened and mounted on each group of adapter mounting holes.

According to a second aspect, an embodiment of the present disclosure provides a distribution frame, including the splicing and termination tray implemented according to any one of the first aspect or the implementations of the first aspect.

According to a third aspect, an embodiment of the present disclosure provides a fiber distribution terminal, including the splicing and termination tray implemented according to any one of the first aspect or the implementations of the first aspect.

According to the splicing and termination tray, the distribution frame, and the fiber distribution terminal provided in the embodiments of the present disclosure, the splicing and termination tray includes the lower splice tray and the adapter panel that is disposed at a front end of the lower splice tray. The adapter panel is detachable from the lower splice tray. The strength of the adapter panel is greater than the strength of the molded part structure. The adapter mounting hole is provided on the adapter panel. The adapter mounting hole is used to fasten adapters. The quantity of the adapters is the $n^{th}$ multiple of 12, where n is a natural number greater than or equal to 2. The strength of the adapter panel is greater than the strength of the molded part structure, and the adapter panel has a relatively small thickness and requires relatively small space. Therefore, the splicing and termination tray has relatively large space for mounting adapters, that is, more adapters can be mounted on the adapter panel that has a relatively small thickness. Therefore, in the embodiments of the present disclosure, the detachable adapter panel that has relatively great strength is used to mount and fasten an adapter. This can improve the capacity of the splicing and termination tray, and further improve the transmission capacity and the splicing capacity, thereby meeting a communication requirement.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the method in the present disclosure, and a person skilled in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person skilled in the art based on the embodiments of the present disclosure without creative efforts shall fall within the protection scope of the present disclosure. The following content describes, in detail, specific implementations, structures, features and effects of the present disclosure with reference to the accompanying drawings and examples of embodiments.

In the specification, claims, and accompanying drawings of the present disclosure, the terms "first", "second", "third", "fourth", and so on (if exists) are intended to distinguish between similar objects, but do not necessarily indicate a specific order or sequence. It should be understood that the data used in such a way are interchangeable in proper circumstances, so that the embodiments of the present disclosure described herein can be implemented in orders except the order illustrated or described herein. Moreover, the terms "include", "contain", and any other variants thereof mean to cover the non-exclusive inclusion. For example, a process, a method, a system, a product, or a device that includes a series of steps or units is not necessarily limited to those steps or units that are expressly listed, but may include other steps or units that are not expressly listed or are inherent to such a process, method, product, or device.

In a conventional structure of a splicing and termination tray, an adapter and a lower splice tray are designed to be integrated. Being limited by the structure, a capacity of the splicing and termination tray is generally 12 cores. This greatly limits a capacity of a fiber distribution terminal and a capacity of a fiber distribution frame. Consequently, product costs and construction costs are increased, and it is difficult to meet a communication requirement.

In view of this, an embodiment of the present disclosure provides a splicing and termination tray, a distribution frame, and a fiber distribution terminal. An adapter and a lower splice tray that are designed to be integrated are improved, and a detachable adapter panel is used to mount and fasten the adapter. This improves a capacity of a splicing and termination tray, and further improves a splicing capacity, thereby meeting a communication requirement. Specifically, referring to FIG. 2A, FIG. 2B, and FIG. 2C, FIG. 2A is a schematic structural diagram of Embodiment 1 of a splice and termination tray according to the present disclosure, FIG. 2B is a schematic exploded view of FIG. 2A, and FIG. 2C is a front view of FIG. 2B.

Figure 1:
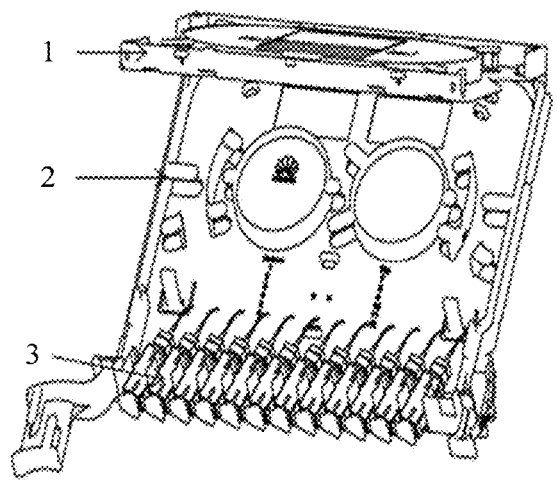
FIG. 1 is a schematic structural diagram of a conventional splicing and termination tray.
Figure 2A:
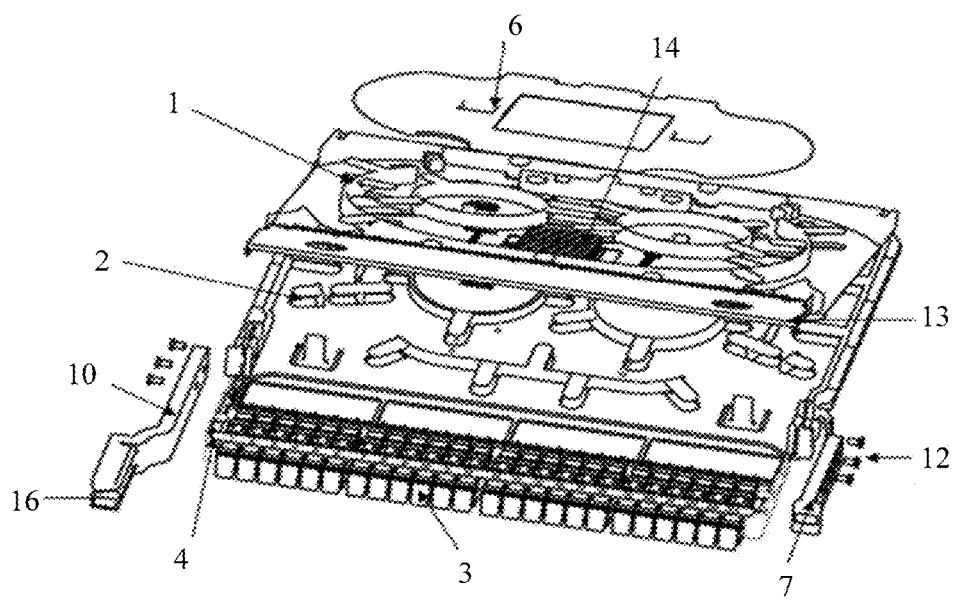
FIG. 2A is a schematic structural diagram of Embodiment 1 of a splice and termination tray according to the present disclosure.
Figure 2B:
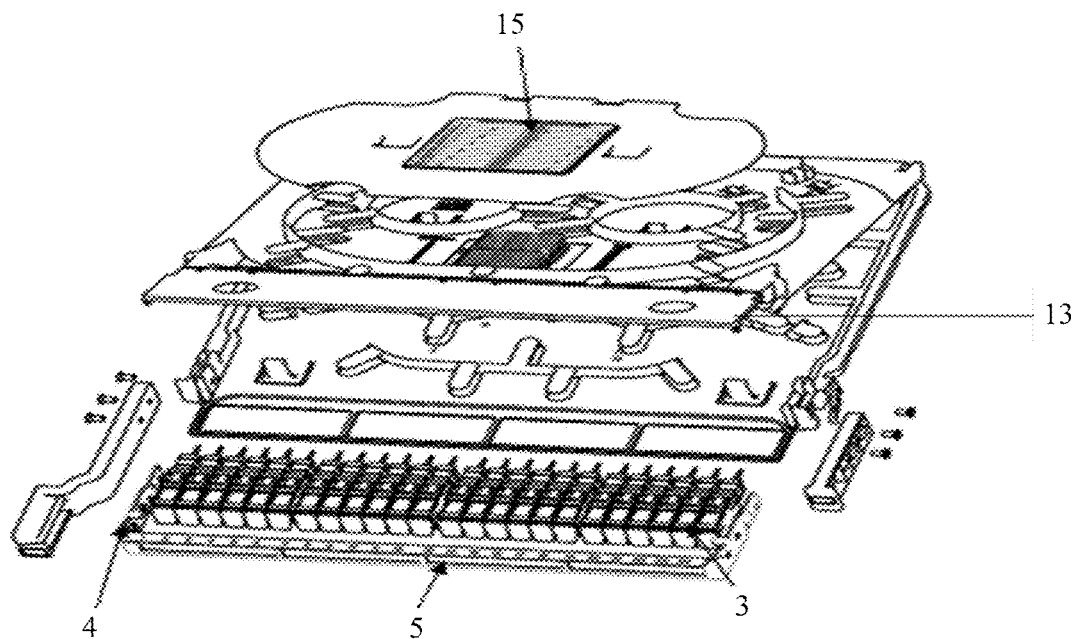
FIG. 2B is a schematic exploded view of FIG. 2A.
Figure 2C:
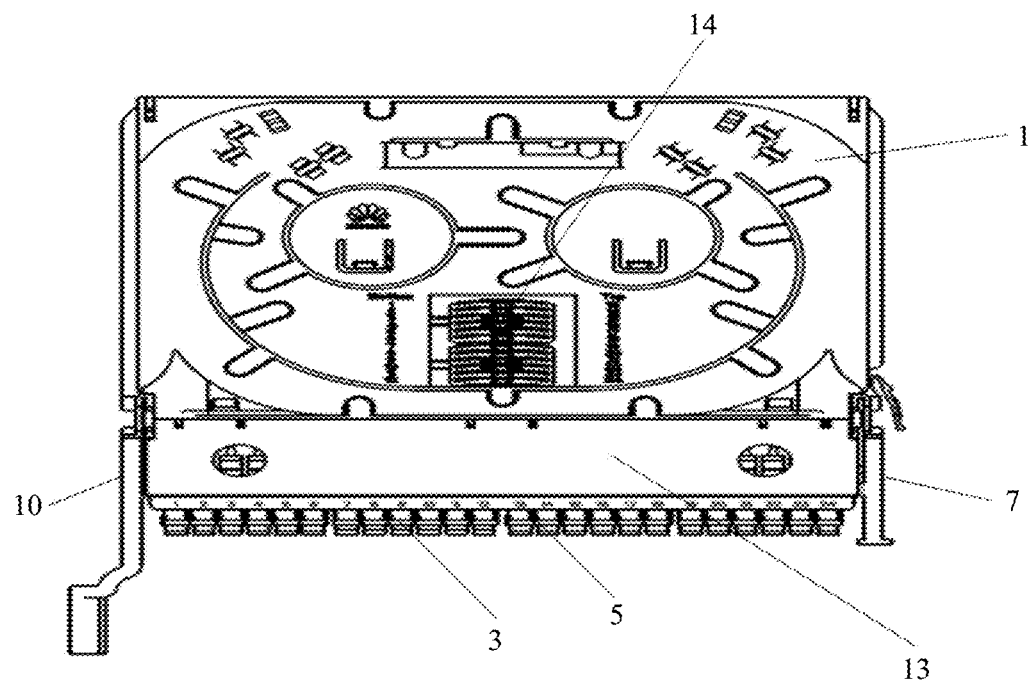
FIG. 2C is a front view of FIG. 2B.

Referring to FIG. 2A to FIG. 2C, in this embodiment of the present disclosure, the splicing and termination tray includes a lower splice tray 2 on a lower layer, and an adapter panel 4 that is disposed at a front end of the lower splice tray 2. The adapter panel 4 is detachable from the lower splice tray 2. Strength of the adapter panel 4 is greater than strength of a molded part structure. An adapter mounting hole 5 is provided on the adapter panel 4. The adapter mounting hole 5 is used to fasten adapters 3. A quantity of adapters 3 is the $n^{th}$ multiple of 12, where n is a natural number greater than or equal to 2. In addition, the splicing and termination tray in this embodiment of the present disclosure further includes an upper splice tray 1 on an upper layer, and a splice tray cover 6. The splice tray cover 6 is disposed on the upper splice tray 1.

Specifically, to implement a high-density and ultra-thin splicing and termination tray, in this embodiment of the present disclosure, an integrated structure of the lower splice tray 2 and the adapter 3 is replaced with a discrete design of the lower splice tray 2 and the adapter 3. That is, the adapter 3 is no longer fastened by designing the lower splice tray 2 and the adapter 3 to be integrated. Instead, the adapter panel 4 that is a structure detachable from the lower splice tray 2 is disposed, and the adapter mounting hole 5 is provided on the adapter panel 4, so that the adapter 3 is fastened by using the adapter mounting hole 5. Because the strength of the adapter panel 4 is greater than the strength of the molded part structure, for example, the adapter panel 4 is a sheet-metal adapter panel, compared with the molded part structure, the adapter panel 4 requires a relatively small thickness. Therefore, the splicing and termination tray has relatively large space for mounting adapters 3, that is, more adapters 3 can be mounted on the adapter panel 4 that has a relatively small thickness. In this way, high-density deployment and mounting of the adapters 3 are implemented by using the detachable adapter panel 4. In addition, a quantity of adapters 3 on a splicing and termination tray is usually required to be a multiple of 12 or a multiple of 6 in the industry. Therefore, in this embodiment of the present disclosure, 24, 36, 48, or even more adapters 3 may be fastened and mounted on the adapter panel 4. In addition, when a relatively small quantity of adapters 3 are required, 12 adapters 3 may be mounted. This is not limited in this embodiment of the present disclosure.

In addition, in this embodiment of the present disclosure, the splice and termination tray has a double-layer structure, that is, the splice and termination tray includes the upper splice tray 1 and the lower splice tray 2. By means of fitting between the adapter panel 4 and the splicing and termination tray that has a double-layer structure, an ultra-thin design in a height direction of the splicing and termination tray is implemented. A height in the ultra-thin design is less than a height of a splicing and termination tray that has an integrated structure, that is, less than 25 mm, and is at least 19.5 mm. By maximizing utilization of space on the splicing and termination tray, a capacity of the splicing and termination tray is greatly improved.

In addition, it should be noted that the splice tray cover 6 is not shown in FIG. 2C.

The splicing and termination tray provided in this embodiment of the present disclosure includes the lower splice tray and the adapter panel that is disposed at the front end of the lower splice tray. The adapter panel and the lower splice tray have detachable structures. The strength of the adapter panel is greater than the strength of the molded part structure. The adapter mounting hole is provided on the adapter panel. The adapter mounting hole is used to fasten adapters. The quantity of adapters is the $n^{th}$ multiple of 12, where n is a natural number greater than or equal to 2. The strength of the adapter panel is greater than the strength of the molded part structure, and the adapter panel has a relatively small thickness and requires relatively small space. Therefore, the splicing and termination tray has relatively large space for mounting adapters, that is, more adapters can be mounted on the adapter panel that has a relatively small thickness. Therefore, in this embodiment of the present disclosure, the detachable adapter panel that has relatively great strength is used to mount and fasten an adapter. This can improve a capacity of the splicing and termination tray, and further improve a transmission capacity and a splicing capacity, thereby meeting a communication requirement.

Optionally, in the foregoing embodiment, a recording tag 16 is disposed on the splice tray cover 6, and is used to record splicing information.

Figure 3A:
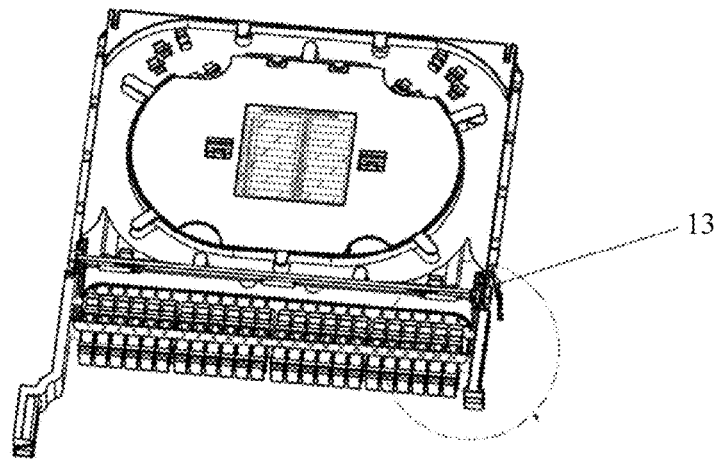
FIG. 3A is a schematic structural diagram of Embodiment 2 of a splicing and termination tray according to the present disclosure.

Optionally, in an embodiment of the present disclosure, a handle 7 is disposed on one side of the front end of the lower splice tray 2. A slot 8 and a buckle 9 are disposed on the lower splice tray 2. The buckle 9 is inserted into the slot 8, to restrict a position of the adapter panel 4. Specifically, referring to FIG. 3A and FIG. 3B, FIG. 3A is a schematic structural diagram of Embodiment 2 of a splicing and termination tray according to the present disclosure, and FIG. 3B is a partially enlarged view of FIG. 3A.

Figure 3B:
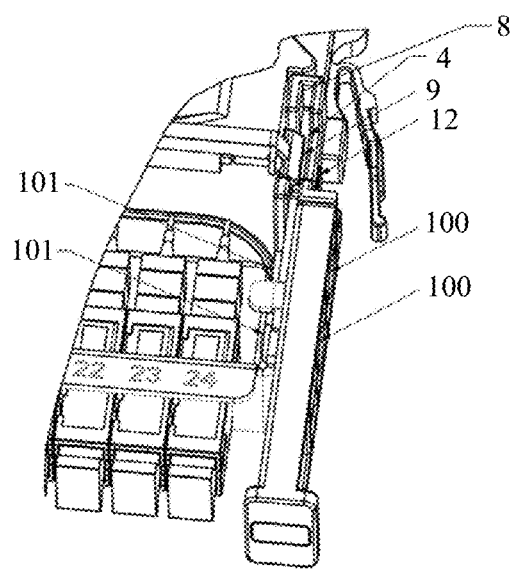
FIG. 3B is a partially enlarged view of FIG. 3A.

As shown in FIG. 3B, an adapter panel 4 is fastened by disposing a buckle 9 and a slot 8 on a lower splice tray 2. By means of fitting between the buckle 9 and the slot 8, a position of the adapter panel 4 is restricted. Further, a second fastener 12 is disposed on the slot 8, and is used to fasten the adapter panel 4 when the buckle 9 is inserted into the slot 8. The second fastener 12 is, for example, a screw, and the adapter panel 4 is fastened by using the screw. When the adapter panel 4 needs to be dismounted, an adapter cover 13 disposed relative to a position of the adapter panel 4 and detachably hinged to an upper splice tray 1 is turned over along a hinge axis, to expose the adapter panel 4. Then, the second fastener 12 is loosened, and the buckle 9 is pushed, to deform the buckle 9. After the buckle 9 is deformed, the buckle 9 cannot buckle the adapter panel 4. In this case, the adapter panel 4 is withdrawn from the slot 8 on the lower splice tray 2. In addition, a self-clinching nut 101 is disposed on the adapter panel 4. By means of fitting between the self-clinching nut 101 and a screw 100, the handle 7 is fastened.

Further, referring to FIG. 2A, in an embodiment of the present disclosure, a fiber ring 10 is disposed on the other side of the front end of the lower splice tray 2, that is, a side opposite to the side on which the handle 7 is disposed. A first fastener 11 is disposed on the fiber ring 10. The first fastener 11 is used to fasten the fiber ring 10 on the adapter panel 4. The adapter panel 4 is located between the handle 7 and the fiber ring 10.

Specifically, a fiber enters the fiber ring 10 through a fiber trough 16, to implement fiber routing management. In addition, the fiber ring 10 may be used as the handle 7 when a module is being mounted or operated.

Further, referring to FIG. 2A and FIG. 2B, in an embodiment of the present disclosure, the splice tray cover 6 is mounted on the upper splice tray 1. For example, the splice tray cover 6 is tightly buckled and mounted on the upper splice tray 1 by using two buckling parts, and is used to protect a splicing area and an area with a coiled bare fiber from being damage from an external force.

Further, referring to FIG. 2A, FIG. 2B, FIG. 2C, and FIG. 3A, in an embodiment of the present disclosure, the splicing and termination tray further includes an adapter cover 13. The adapter cover 13 is disposed relative to a position of the adapter panel 4. The adapter cover 13 is detachably hinged to the upper splice tray 1, and the adapter cover 13 can be turned over along a hinge axis. The adapter cover 13 is disposed to protect the adapter 3 and conveniently replace the adapter panel 4.

Optionally, in an embodiment of the present disclosure, the upper splice tray 1 is connected to the lower splice tray 2 by using a rotating-shaft fitting structure, so that the upper splice tray 1 is rotatably operable.

Optionally, in an embodiment of the present disclosure, the splice tray further includes a splice cassette 14. The splice cassette 14 is detachably disposed on the upper splice tray 1, and is used to splice fibers.

Optionally, in an embodiment of the present disclosure, the adapters 3 are vertically mounted on the adapter panel 4. The adapters 3 occupy a relatively small width when the adapters 3 are vertical. Therefore, a capacity of the splicing and termination tray can be improved.

The splice tray in the present disclosure is described in detail below by using an example in which 24 adapters 3 are mounted on the adapter panel 4. Specifically, referring to FIG. 4A and FIG. 4B, FIG. 4A is a schematic structural diagram of Embodiment 3 of a splicing and termination tray according to the present disclosure, and FIG. 4B is a schematic diagram of a size of the splice and termination tray shown in FIG. 4A.

Figure 4A:
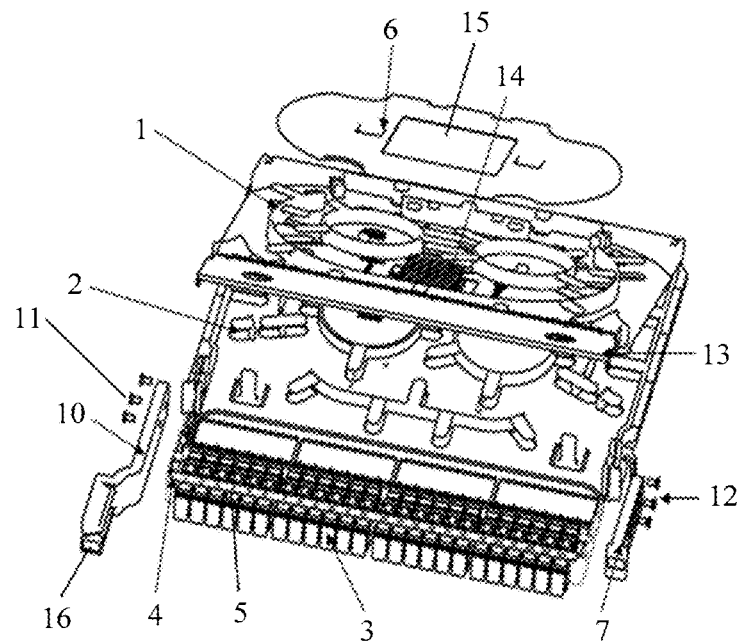
FIG. 4A is a schematic structural diagram of Embodiment 3 of a splicing and termination tray according to the present disclosure.
Figure 4B:
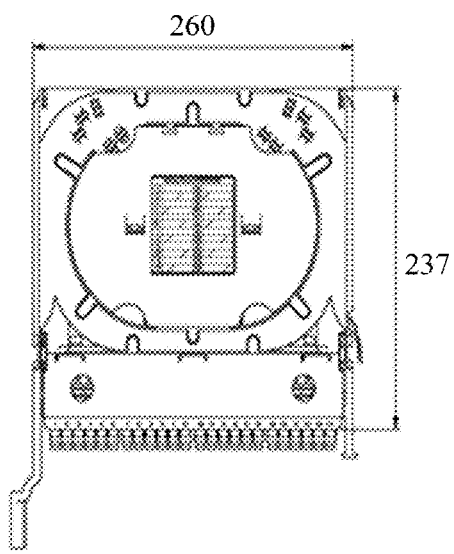
FIG. 4B is a schematic diagram of a size of the splice and termination tray shown in FIG. 4A.

Referring to FIG. 4A, four groups of adapter mounting holes 5 are provided on the adapter panel 4. Six adapters 3 are fastened and mounted on each group of adapter mounting holes 5, and 24 adapters 3 in total are mounted. In this way, a 24-core high-density splice tray structure is implemented. Referring to FIG. 4B, when a quantity of adapters 3 is 24, a length of the splice tray is 260 mm, a width of the side on which the handle 7 is mounted is approximately 237 mm, and a thickness of the splice tray is approximately 19.5 mm (not shown).

In addition, based on the foregoing splicing and termination tray, an embodiment of the present disclosure further provides a distribution frame, including the splicing and termination tray implemented in any one of the foregoing embodiments. For a specific structure and beneficial effects of the distribution frame, refer to the foregoing embodiments. Details are not described herein.

In addition, based on the foregoing splicing and termination tray, an embodiment of the present disclosure further provides a fiber distribution terminal, including the splicing and termination tray implemented in any one of the foregoing embodiments. For a specific structure and beneficial effects of the fiber distribution terminal, refer to the foregoing embodiments. Details are not described herein.

In a feasible implementation, a splicing and termination unit plug-in frame may be disposed on the distribution frame or the fiber distribution terminal. The splicing and termination tray is inserted into the splicing and termination unit plug-in frame, so that the splicing and termination tray is mounted on the distribution frame or the fiber distribution terminal.

In another feasible implementation, a guide rail may be disposed on the distribution frame or the fiber distribution terminal. The splicing and termination tray is guided into the distribution frame or the fiber distribution terminal by using the guide rail.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A splicing and termination tray, comprising:
   a first splice tray;
   a second splice tray, wherein the first splice tray is lower than the second splice tray;
   an adapter panel that is disposed at a front end of the first splice tray, wherein the adapter panel is detachable from the first splice tray, wherein an adapter mounting hole is provided on the adapter panel, wherein the adapter mounting hole is used to fasten adapters, wherein a quantity of adapters is the $n^{th}$ multiple of 12, and wherein n is a natural number greater than or equal to 2; and
   an adapter cover, wherein the adapter cover is disposed relative to a position of the adapter panel, wherein the adapter cover is detachably hinged to the second splice tray, and wherein the adapter cover can be turned over along a hinge axis.

2. The splicing and termination tray according to claim 1, wherein:
   a handle is disposed on one side of the front end of the first splice tray, a slot and a buckle are disposed on the first splice tray, and a position of the adapter panel is restricted by fitting between the buckle and the slot;
   a fiber ring is disposed on the other side of the front end of the first splice tray, a first fastener is disposed on the fiber ring, and the first fastener is used to fasten the fiber ring on the adapter panel; and
   the adapter panel is located between the handle and the fiber ring.

3. The splicing and termination tray according to claim 2, wherein a second fastener is disposed on the slot, and is used to fasten the adapter panel when the buckle is inserted into the slot.

4. The splicing and termination tray according to claim 1, wherein the adapter panel is a sheet-metal adapter panel.

5. The splicing and termination tray according to claim 1, wherein the second splice tray is connected to the first splice tray by using a rotating-shaft fitting structure, and wherein the second splice tray is rotatably operable.

6. The splicing and termination tray according to claim 1, further comprising a splice cassette, wherein the splice cassette is detachably disposed on the second splice tray, and is used to splice fibers.

7. The splicing and termination tray according to claim 1, wherein the adapters are vertically mounted on the adapter panel.

8. A distribution frame, comprising a splicing and termination tray, wherein the splicing and termination tray comprises a first splice tray, a second splice tray, an adapter panel that is disposed at a front end of the first splice tray, and an adapter cover, wherein the first splice tray is lower than the second splice tray, wherein the adapter panel is detachable from the first splice tray, wherein an adapter mounting hole is provided on the adapter panel, wherein the adapter mounting hole is used to fasten adapters, wherein a quantity of adapters is the $n^{th}$ multiple of 12, wherein n is a natural number greater than or equal to 2, wherein the adapter cover is disposed relative to a position of the adapter panel, wherein the adapter cover is detachably hinged to the second splice tray, and wherein the adapter cover can be turned over along a hinge axis.

9. The distribution frame according to claim 8, wherein:
   a handle is disposed on one side of the front end of the first splice tray, a slot and a buckle are disposed on the first splice tray, and a position of the adapter panel is restricted by fitting between the buckle and the slot;
   a fiber ring is disposed on the other side of the front end of the first splice tray, a first fastener is disposed on the fiber ring, and the first fastener is used to fasten the fiber ring on the adapter panel; and
   the adapter panel is located between the handle and the fiber ring.

10. The distribution frame according to claim 9, wherein a second fastener is disposed on the slot, and is used to fasten the adapter panel when the buckle is inserted into the slot.

11. The distribution frame according to claim 8, wherein the adapter panel is a sheet-metal adapter panel.

12. The distribution frame according to claim 8, wherein the second splice tray is connected to the first splice tray by using a rotating-shaft fitting structure, and wherein the second splice tray is rotatably operable.

13. A fiber distribution terminal, comprising a splicing and termination tray, wherein the splicing and termination tray comprises a first splice tray, a second splice tray, an adapter panel that is disposed at a front end of the first splice tray, and an adapter cover, wherein the first splice tray is lower than the second splice tray, wherein the adapter panel is detachable from the first splice tray, wherein an adapter mounting hole is provided on the adapter panel, wherein the adapter mounting hole is used to fasten adapters, wherein a quantity of adapters is the $n^{th}$ multiple of 12, wherein n is a natural number greater than or equal to 2, wherein the adapter cover is disposed relative to a position of the adapter panel, wherein the adapter cover is detachably hinged to the second splice tray, and wherein the adapter cover can be turned over along a hinge axis.

14. The fiber distribution terminal according to claim 13, wherein:

a handle is disposed on one side of the front end of the first splice tray, a slot and a buckle are disposed on the first splice tray, and a position of the adapter panel is restricted by fitting between the buckle and the slot;

a fiber ring is disposed on the other side of the front end of the first splice tray, a first fastener is disposed on the fiber ring, and the first fastener is used to fasten the fiber ring on the adapter panel; and the adapter panel is located between the handle and the fiber ring.

15. The fiber distribution terminal according to claim 14, wherein a second fastener is disposed on the slot, and is used to fasten the adapter panel when the buckle is inserted into the slot.

16. The fiber distribution terminal according to claim 13, wherein the adapter panel is a sheet-metal adapter panel.

17. The fiber distribution terminal according to claim 13, wherein the splicing and termination tray further comprises a splice cassette, wherein the splice cassette is detachably disposed on the second splice tray, and is used to splice fibers.

18. The fiber distribution terminal according to claim 13, wherein the adapters are vertically mounted on the adapter panel.

19. The distribution frame according to claim 8, wherein the adapters are vertically mounted on the adapter panel.

20. The fiber distribution terminal according to claim 13, wherein the second splice tray is connected to the first splice tray by using a rotating-shaft fitting structure, and wherein the second splice tray is rotatably operable.

* * * * *